United States Patent [19]

Turner

[11] 4,443,401
[45] Apr. 17, 1984

[54] APPARATUS FOR AND METHOD OF THERMOFORMING PLASTIC CANS

[75] Inventor: Howard M. Turner, Mount Vernon, Ohio

[73] Assignee: The Continental Group, Inc., Stamford, Conn.

[21] Appl. No.: 331,738

[22] Filed: Dec. 17, 1981

[51] Int. Cl.³ ............................................ B29C 17/04
[52] U.S. Cl. ................................... 264/544; 264/549; 264/550; 264/314; 425/387.1; 425/388; 425/389; 425/398; 425/400
[58] Field of Search ...................... 425/387.1, 388, 389, 425/398, 400; 264/547, 549, 314, 550, 292, 551, 544

[56] References Cited

U.S. PATENT DOCUMENTS

| | | | |
|---|---|---|---|
| 1,760,288 | 5/1930 | Stevens | 425/400 |
| 2,917,783 | 12/1959 | Olson et al. | 264/547 |
| 3,463,844 | 8/1969 | Griffin | 264/549 |
| 3,642,415 | 2/1972 | Johnson | 425/389 |
| 3,737,494 | 6/1973 | Wolf | 264/549 |
| 3,814,784 | 6/1974 | Wolf | 264/549 |
| 3,975,493 | 8/1976 | Tigner et al. | 264/550 X |

FOREIGN PATENT DOCUMENTS 38371 10/1981 European Pat. Off. ............ 264/549

Primary Examiner—Jan H. Silbaugh
Attorney, Agent, or Firm—Charles E. Brown

[57] ABSTRACT

This relates to the thermoforming of can bodies for use in packaging beverages under pressure from polyester sheet material, preferably PET. In accordance with the invention, a forming gas is applied to the periphery of the clamped sheet portion in radially outwardly spaced relation with respect to an associated mold cavity and the sheet material is billowed up into a large cavity formed in the clamp so as to provide for high stretching and orientation of the peripheral portion of the sheet before the sheet is directed into an associated mold cavity. Further, a plunger which normally forces the billowed or initially stretched sheet into the mold cavity may be constructed so as to be radially expandible to thus positively radially expand the sheet material within the mold. The operation of the molding apparatus is one wherein the periphery of the sheet material from which the cup is formed has a much greater biaxial orientation than heretofore possible, and therefore the resultant can body is much stronger than that previously feasible with the same material. This abstract forms no part of the specification of this application and is not to be construed as limiting the claims of the application.

11 Claims, 13 Drawing Figures

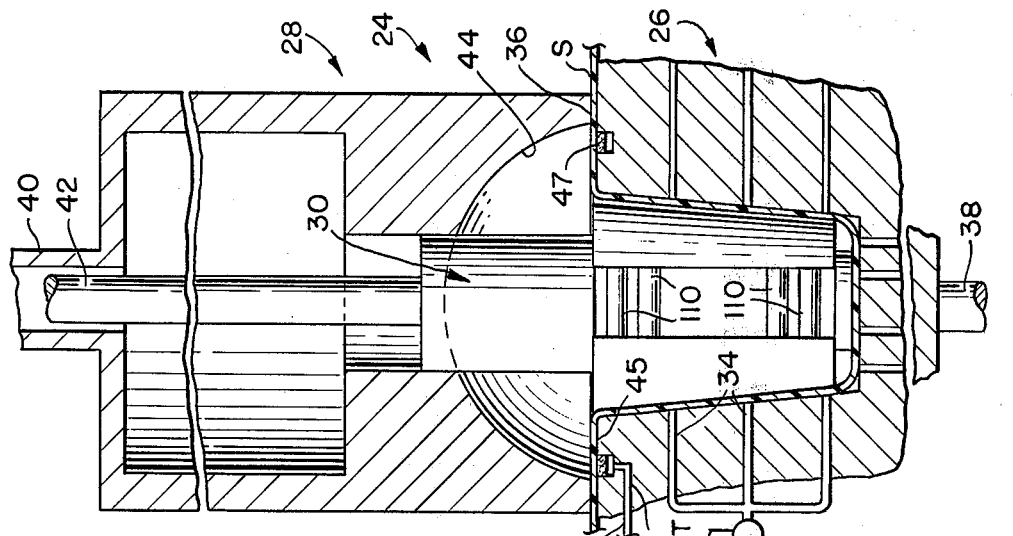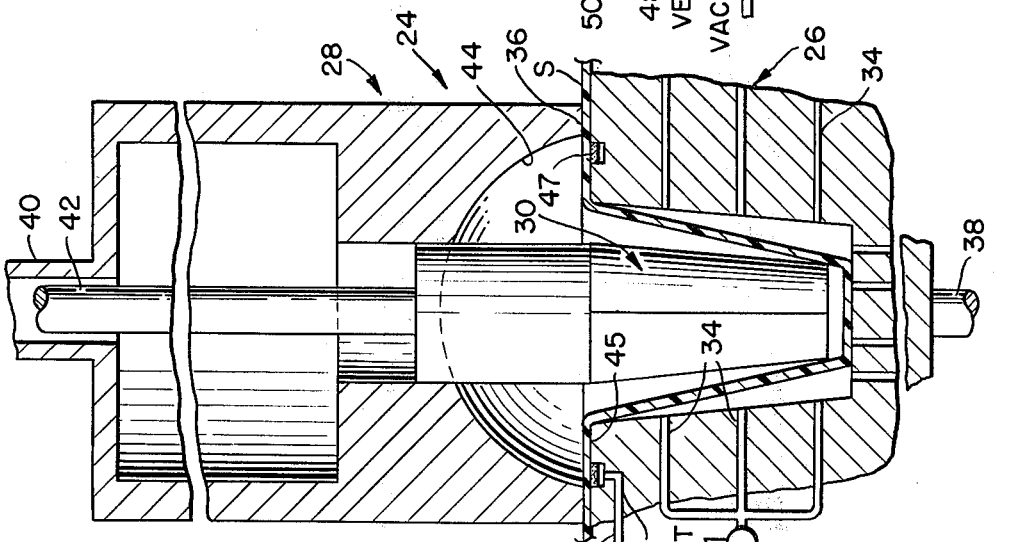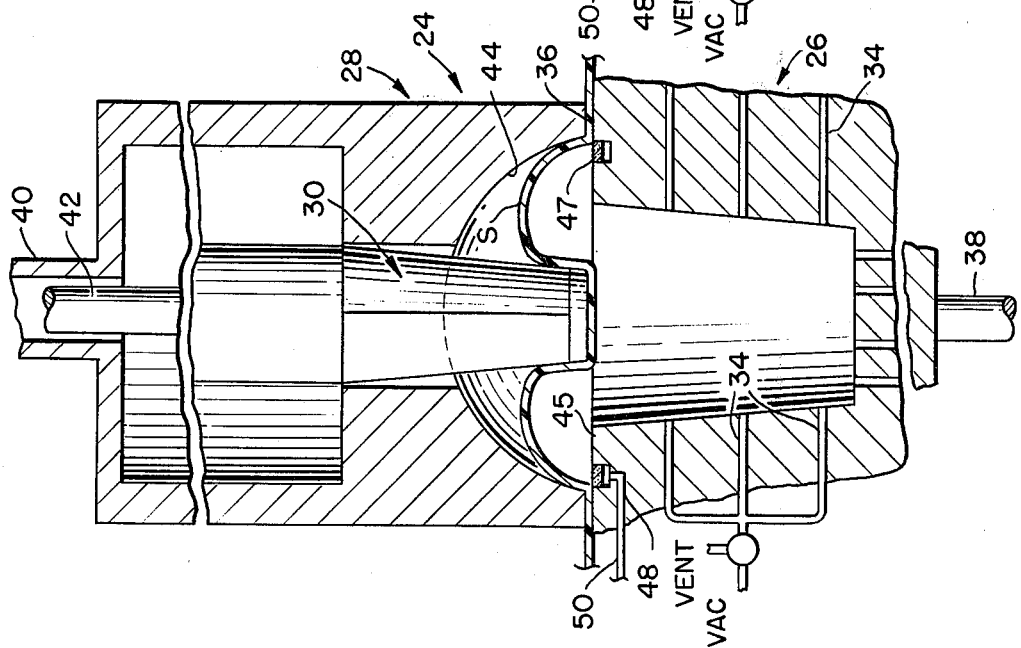

APPARATUS FOR AND METHOD OF THERMOFORMING PLASTIC CANS

This invention relates in general to new and useful improvements in thermoforming of plastic containers and more particularly to an apparatus for and method of thermoforming plastic cans suitable for packaging carbonated beverages and the like which are packaged under pressure.

At the present there is being formed from polyester sheet material, particularly polyethylene terephthalate (PET) cans in which liquids, such as soft drinks and beer, are being packaged under pressure. However, it has been found that the side wall of the cans, particularly in the flange area, does not have sufficient strength and is subject to undue cracking or rupture. It is the purpose of this invention to provide an apparatus and method for forming similar cans which are not so subject to such cracking or rupture.

It is known that polyesters, particularly PET, when molded to have high biaxial orientation, exhibit great strength and resistance to cracking. However, when articles are thermoformed in the normal manner, the polyester is primarily subjected to stretching in one direction, i.e. axially of the container, with there being very little radial or hoop orientation.

In the past, during the initial forming stage the interior of the mold cavity has been pressurized so as to cause the sheet material to billow upwardly a short distance within the associated clamp for material distribution. This billow, however, does not provide adequate biaxial orientation.

In accordance with this invention, it is proposed to provide the mold with a relatively wide ledge and wherein an associated clamp will clamp the sheet material against the mold ledge remote from the mold cavity. Then, instead of internally pressurizing the mold cavity from within the mold cavity to provide the sheet billowing pressure, the mold ledge is provided, adjacent that portion thereof which is opposed by the clamp, with an annular passage for directing a gas under pressure against the sheet material adjacent to the area which is clamped against the mold. In this way uniform stretching of the sheet material at a selected orientation temperature is initiated near the clamp which provides relatively high orientation in the hoop direction followed by plug assist forming.

Further, in accordance with this invention, the relatively shallow prior billow used for initially decreasing flange thickness of the sheet material in the clamp is greatly increased in size and assumes generally hemispherical configuration. In this manner, a greater stretching of the sheet material by a billowing or ballooning thereof is initially effected with this stretching being primarily in the hoop or radial direction.

The upwardly billowing sheet material is engaged by a plunger which may initially project into the clamp cavity. As soon as the billowing is completed, the gaseous forming pressure is removed and the mold cavity may be vented to atmosphere while at the same time downward movement of the plunger is effected and the previously upwardly billowing sheet material is drawn down into the mold cavity.

The movement of the sheet material into the mold cavity may be assisted by applying vacuum to the vents and, after the plunger has reached the limits of its downward movement, vacuum is now drawn in the mold cavity if it has not been previously effected. At the same time, air may be directed into the interior of the sheet material so as to assist the vacuum and wherein final forming of the sheet material to the mold cavity configuration is effected. If desired, as will be described in detail hereinafter, the plunger may be of an expandable type.

By controlling the area of the sheet material which is initially stretched under gaseous pressure and by permitting a relatively great stretching of the sheet material in the hoop direction before the sheet material is forced into the mold cavity by the plunger, it has been found that biaxial orientation may be obtained in that portion of the resultant container which forms the flange to which a closure is secured, and, further, there is relatively greater orientation in the hoop direction in the body so as to prevent the undue rupture or cracking which has been experienced to date. The relatively greater orientation in the hoop direction in the body also serves greatly to improve creep resistance.

With the above and other objects in view that will hereinafter appear, the nature of the invention will be more clearly understood by reference to the following detailed description, the appended claims, and the several views illustrated in the accompanying drawings.

IN THE DRAWINGS

FIG. 4 is a sectional view similar to FIG. 3 with the plunger in a lowered position ready to enter into the mold cavity.

FIG. 5 is a vertical sectional view similar to FIG. 4, but with the plunger at the end of its travel into the mold cavity.

FIG. 6 is a vertical sectional view similar to FIG. 5, and shows the plunger in its radially expanded condition.

Figure 1:
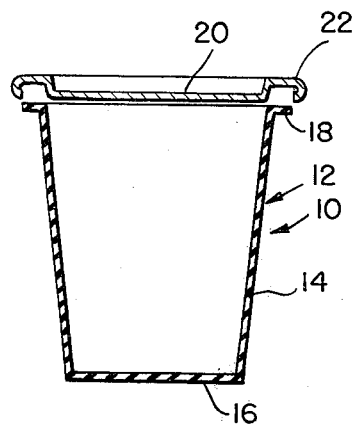
FIG. 1 is a schematic sectional view taken through a can and a closure for the can which is of the general type which is to be formed in accordance with this invention.

Referring now to the drawings in detail, reference is first made to FIG. 1 wherein there is illustrated a typical container of the type which is to be made in accordance with this invention. The container, which is generally identified by the numeral 10, is not in and of itself part of this invention, nor is it new. Such a container has been in the past commercially exploited and is the subject of patents and patent applications of others. The illustrated container includes a can, generally identified by the numeral 12, which is formed of PET or other thermoplastics or thermoplastic laminates provided in sheet form and thermoformed within a mold. The can 12 includes a body 14 having an integral bottom 16 and with the open end of the can having a cover securing flange 18. A suitable cover, closure or end unit 20 is provided for sealing the can after it has been filled with a suitable liquid product, such as beer and soda. The end unit 20 is provided with a peripheral curl 22 which seats on the flange 18 and which is turned or folded with the flange 18 to form a conventional seam securing the end unit 20 to the can 12 in gas tight relation. Although a conventional metal end unit has been illustrated, it is to be understood that the container of this invention is not restricted to metal end units and may have the open upper end thereof slightly modified for cooperation with a variety of different types of conventional end units. The can is preferably tapered as illustrated so that cans may nest one within the other and, if desired, the upper portion of the can may be radially outwardly stepped to provide an anti-wedging shoulder.

Figure 2:
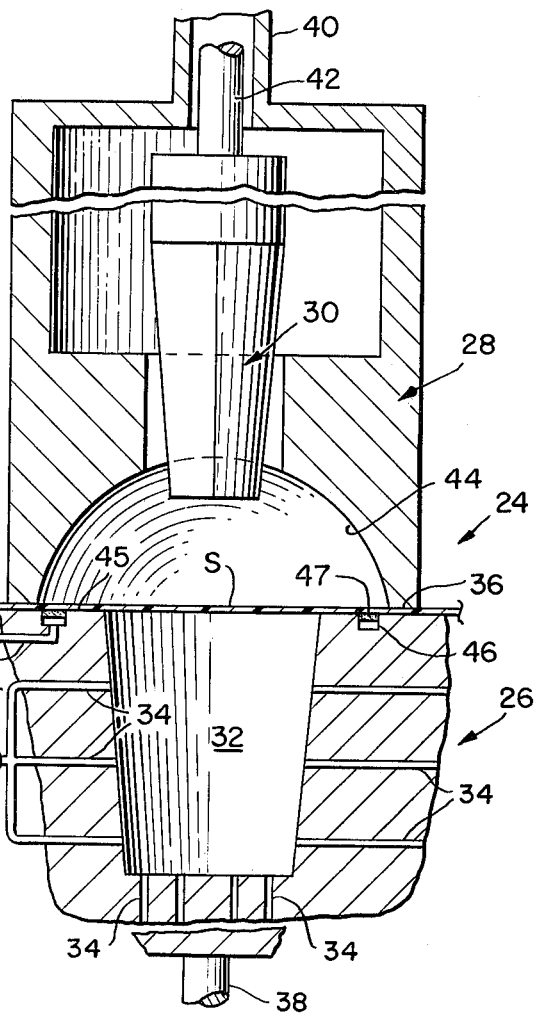
FIG. 2 is a vertical sectional view taken through a single cavity mold, and shows the principle of mold construction in accordance with this invention.

Reference is now made to FIG. 2 wherein there is illustrated a mold assembly for receiving sheet material heated to a selected orientation temperature for forming the can 12. The mold assembly is generally identified by the numeral 24 and includes a mold 26, a clamp 28 and a plunger 30. For the most part, the mold 26 is of a conventional construction. The mold 26 has formed therein a mold cavity 32 which will be described hereinafter. The mold 26 is provided with minute passages 34 which open into the mold cavity 32 for the purpose of initially venting the mold cavity as sheet material S is forced down into the mold cavity, and thereafter applying a vacuum to the sheet material to draw the sheet material to the configuration of the mold cavity.

The clamp 28 is provided with an annular clamping surface 36 which cooperates with the upper surface of the mold 26 to clamp the thermoplastic material in sheet form between the clamp and the mold and may be temperature controlled.

It is to be understood that the mold 26 and the clamp 28 are carried by suitable support means 38 and 40, respectively, for effecting the relative movement of the mold 26 and the clamp 28 axially of the mold cavity between an open position and a closed position. Primary movement of the unit will be that of the mold 26 so as to clear a newly formed can while the sheet material retains its original planar state. There may be selected movement of the clamp.

The plunger 30 is carried by a separate movable support 42 for movement with and independently of the clamp 28.

The clamp 28 is provided with a relatively deep, generally hemispherical sheet forming cavity 44. In the past, this cavity, if used at all, has been relatively shallow. Further, it will be seen that the sheet engaging portion 36 of the clamp is spaced a considerable distance from the mold cavity 32 so that there is defined at the top of the mold 26 surrounding the mold cavity 32 a relatively wide annular ledge 45. The size of the ledge 45 increases that area of the sheet which is available for stretching. Further, in lieu of having a sheet billowing pressurized gas being introduced into the mold cavity 32, such as through the minute passages 34, there is provided an annular gas passage 46 which opens through the ledge 45 adjacent that portion of the mold 26 which opposes the effective portion of the clamp 28. Gas (air) under pressure is supplied to the passage 46 through a supply passage 48 from a supply line 50.

By placing the gas supply passage 46 in a position relatively widely spaced radially from the opening of the mold cavity 32 and at a position adjacent the clamp 28, it will be seen that, first of all, a larger area of the sheet material will be subjected to billowing. Secondly, by applying the gaseous pressure directly and uniformly against the outer portion of the sheet, it will be seen that the initial stretching of the sheet material is not preferentially in the center of the sheet material, but in the peripheral portion thereof. Thus, greater circumferential orientation of the sheet material is obtained in that portion of the sheet material which eventually becomes the flange 18, as well as that portion which forms the upper portion of the body.

By increasing the size of the sheet forming cavity 44 and by making it generally hemispherical in outline, it will be seen that the initial forming of the sheet at the selected orientation temperature provides for relatively great radial or circumferential stretching which will produce high biaxial orientation of the sheet material, particularly that which is in the upper part of the resultant can body and in the flange 18.

Figure 8:
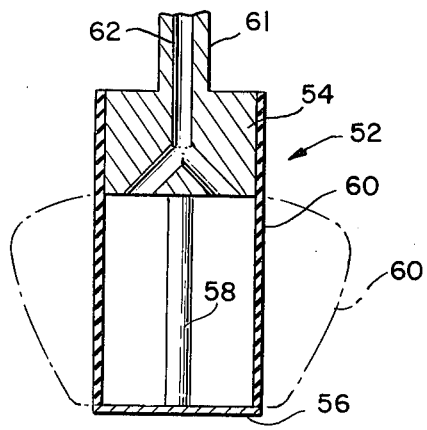
FIG. 8 is a sectional view taken through one form of plunger, and shows the general construction thereof.

Referring now to FIG. 8, it will be seen that there is illustrated a modified form of plunger which is expandable, the plunger being generally identified by the numeral 52. The plunger 52 includes a head section 54 and a base section 56 which are joined together by a separator bar 58. Telescoped over the head section 54 and the base section 56 is a resiliently deformable sleeve 60.

The plunger 52 is carried by a rod 61 which is provided with a fluid passage 62 therethrough. The fluid passage 62 is connected to a suitable source of fluid under pressure (not shown) and opens into the space within the sleeve 60 between the head 54 and the base 56. It will be seen that when fluid is introduced into the sleeve 60, the sleeve will expand radially outwardly as shown in dotted lines to be beneficially utilized in the initial stretching of the thermoplastic sheet material within the mold cavity 32. It is to be understood that when the fluid pressure is relieved within the sleeve 60, it will have sufficient resiliency to return to its original state.

If desired, the base 56 may also be of a generally bladder-like construction and may be expandable in association with like pockets (not shown) in the bottom of the mold cavity to define feet or other bulbous portions on the can 12.

Figure 9:
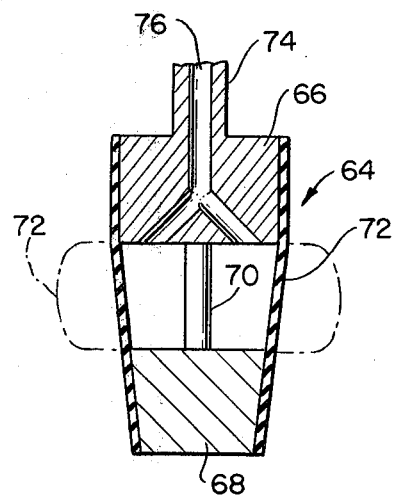
FIG. 9 is a sectional view similar to FIG. 8 of a modified form of plunger.

Reference is now made to FIG. 9 wherein there is illustrated still another form of expandable plunger generally identified by the numeral 64. The plunger 64 differs from the plunger 52 only in the axial extent of the expandable portion thereof.

The plunger 64 includes a head 66 and a base 68 joined by a spacer 70. The sleeve of resilient deformable material 72 is telescoped over the head 66 and the base 68.

The plunger 64 is carried by a rod 74 which is hollow to define a fluid passage 76 which opens into a space within the sleeve 72 between the head 66 and the base 68. The passage 76 will be connected to a source of fluid under pressure which, when introduced into the interior of the sleeve 72, will outwardly expand the sleeve 72 in a radial direction to the configuration shown in dotted lines.

Figure 10:
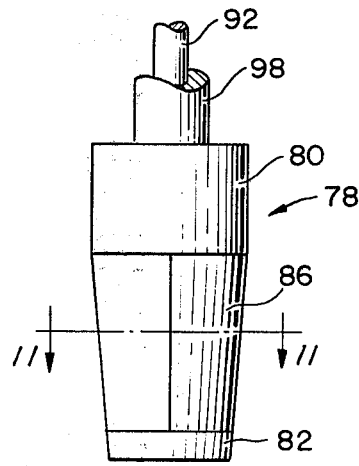
FIG. 10 is an elevational view of another form of expandable plunger.
Figure 11:
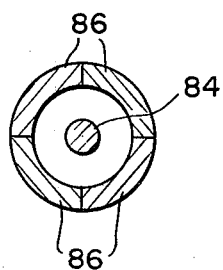
FIG. 11 is a transverse sectional view taken generally along the line 11—11 of FIG. 10, and shows the constructional details of the plunger.

Referring now to FIGS. 10 and 11, it will be seen that there is illustrated yet another form of expandable plunger, generally identified by the numeral 78. The plunger 78 includes a head 80 and a base 82 retained in spaced relation by a vertical spacer 84. Between the head 80 and the base 82 are a plurality of plunger segments 86 which are mounted relative to the head 80 and the base 82 in any desired manner wherein they will move in a controlled radial direction.

Figure 12:
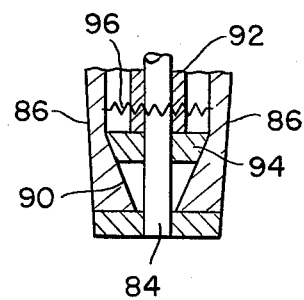
FIG. 12 is a fragmentary vertical sectional view taken through the center of the plunger of FIG. 10, and shows the details of cam means for effecting the expansion of the plunger.

Referring now to FIG. 12, it will be seen that one type of actuator for the plunger segments 86 is illustrated. In this embodiment, the upper and lower portions of the plunger segments will be provided with cam surfaces 90 of which only the lower cam surface is illustrated. A control rod 92 is mounted on the spacer rod 84 for selective vertical movement and is provided with upper and lower cams of which only a lower cam 94 is illustrated. The cams will cooperate with the cam surface of the plunger segments so, when the control rod 92 is moved downwardly, the cam segments 86 will be moved radially outwardly. If desired, suitable return means in the form of a spring may be utilized for returning the cam segments to their retracted positions. On the other hand, there may be an interlock between each cam and the respective cam surface so as to draw the segments 86 back to their original positions.

Referring now to FIG. 10, it will be seen that the plunger 78 is carried by a support rod 98 which is hollow and has slidably mounted therein the control rod 92.

Figure 13:
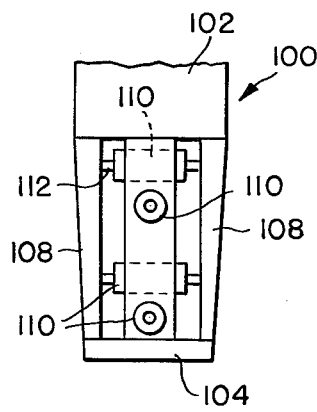
FIG. 13 is a vertical sectional view with parts broken away of yet another form of expandable plunger utilizing hydraulic means to effect the expansion thereof.

Reference is now made to FIG. 13 wherein yet another form of plunger, generally identified by the numeral 100, is illustrated. The plunger 100 includes a head 102 and a base 104 which is spaced from the head 102 by a rod 106. The plunger 100, like the plunger 78, is provided with a plurality of expandable segments 108. The ends of the plunger segments 108 are mounted with respect to the head 102 and the base 104 for controlled radial movement.

Each set of opposed plunger segments 108 is positioned by means of two fluid cylinders 110 having piston rods 112 connected to the respective segments.

It is to be understood that the plunger 100 will be provided with a suitable support rod, such as the support rod 98, and that the same may be hollow for a fluid to be delivered to the cylinders 110. It is also to be understood that the cylinders 110 may either be of a double acting type or may be spring biased to a position wherein the segments 108 are in their retracted positions.

Figure 3:
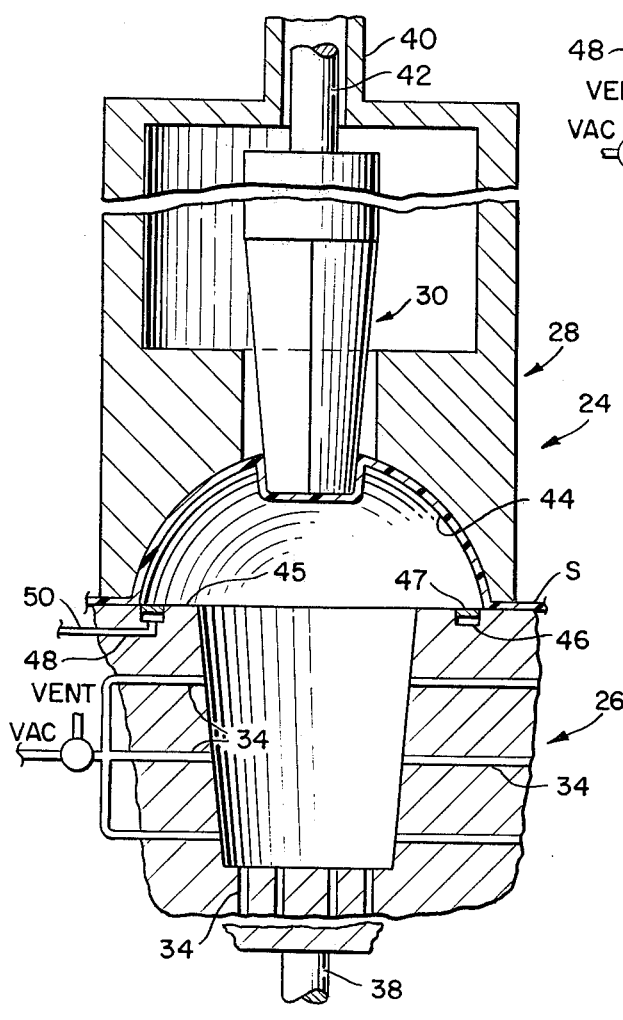
FIG. 3 is a vertical sectional view similar to FIG. 2, and shows the sheet material clamped in place and being deformed within the material forming cavity by way of gaseous pressure.

Referring now to FIG. 3, it will be seen that the operation of the mold assembly in accordance with this invention is illustrated. A sheet S of suitable material, preferably PET although various other thermoplastic materials as well as laminates may be utilized, heated to a selected orientation temperature, is placed between the mold 26 and the clamp 28 and the relative movement of the mold 26 and the clamp 28 together is effected so as to clamp the sheet in place. In FIG. 3, the sheet is illustrated as clamped in place and with the blowing has having been operative to billow the sheet generally upwardly around the plunger 30 to the configuration of the sheet forming cavity 44 of the clamp 28. In view of the fact that the forming gas from the passage 46 strikes the sheet adjacent the periphery of that portion which is clamped by the clamp 28, there is more stretching of the annular ring of material whose ID is the OD of the plug and whose OD is the ID of the clamp.

It has been found that forming gas from the passage 46 is preferably diffused. Accordingly, the upper part of the passage 46 is provided with an insert 47 which may be in the form of a porous gas passing member such as a sintered material, or the member 47 may be an apertured member or formed of a plurality of closely spaced rings. Also, while the plunger 30 has been illustrated in a substantially fully retracted position, depending upon the specific configuration of the cavity 44, the sheet material being formed, the mold cavity 32 and the plunger shape, the plunger may be in selected lowered positions at the time the sheet is billowed upwardly within the cavity 44.

Referring now to FIG. 4, it will be seen that the plunger 30 has moved down with the billowed sheet having a greater generally toroidal configuration. In view of the fact that the pressurizing gas from the passage 46 has now been cut off and the vent passages 34 opened to the atmosphere, the movement of the plunger 30 primarily effects a reshaping of the sheet material without additional stretching.

In FIG. 5, the plunger has moved down into the mold cavity 32 so as to move the central part of the sheet material down into the bottom portion of the cavity. It is to be understood that at some point during the downward movement of the plunger, or at least when the plunger reaches its lowermost position, the vent passages 34 are connected to a vacuum source so as to assist in the shaping of the sheet material to match match the configutation of the mold cavity 32. If desired, a forming gas may be directed into the mold cavity 32 interiorly of the formed sheet material through suitable openings in the plunger or clamp so as to assist in the forming of the sheet material to the shape of the cavity 32.

Figure 7:
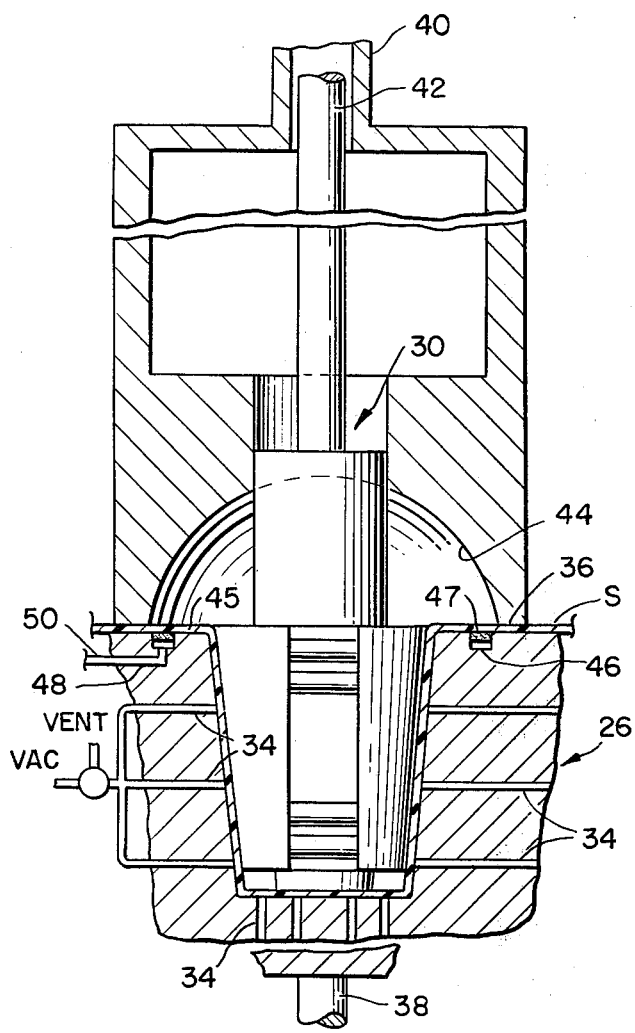
FIG. 7 is a vertical sectional view similar to FIG. 6, and shows the mold with vacuum applied to the mold cavity for drawing the partially formed sheet to the configuration of the mold.

When the plunger 30 of FIG. 2 is of a fixed shape, i.e. non-expandable, the final forming operation is effected solely by way of the aforementioned vacuum and internal pressure. This is shown in FIG. 7. On the other hand, it is feasible, as explained above with respect to the plungers of FIGS. 8–13, that the plunger could be radially expandable and such a plunger operation is shown in FIG. 6 wherein there is a controlled radial expansion of the sheet material and thus further hoop orientation of the sheet material due to the mechanical action of the plunger.

It is to be understood that at all times during the sheet forming operation the sheet material must be maintained at the optimum temperatures for orientation and/or forming. Thus, selective heating of the plunger, mold, clamp, blowing gas, etc., may be required.

It will be seen that in the thermoforming operation in accordance with this invention there is considerable radial or circumferential stretching of the sheet material as well as axial stretching as would normally occur. This additional radial or circumferential stretching together with the axial stretching produces a biaxial orientation of the polyester material and thus provides a relatively great strength within the polyester material. By obtaining biaxial orientation within the flange 18 in the upper part of the body 14, flange cracking and body cracking or splitting can be minimized.

Although only a preferred embodiment of the molding apparatus and the use thereof has been specifically illustrated and described herein, it is to be understood that minor variations may be made in the mold assembly constructed without departing from the spirit and scope of the invention as defined by the appended claims.

I claim:

1. In an apparatus for the thermoforming of containers, said apparatus comprising a female mold member defining a mold cavity having an opening defined by a surrounding clamp surface, a clamp overlying said mold member to retain a sheet between said clamp and said mold member, means mounting said mold member and said clamp for relative movement axially of said mold cavity between a sheet clamping position and a molded article releasing position, and a sheet forming plunger carried by said clamp and movable relative to said clamp into said mold cavity for at least effecting an initial forming of a sheet within said mold cavity, the improvement comprising said clamp having a clamping surface surrounding said mold cavity opening and being radially outwardly spaced from said mold cavity opening wherein said clamp is operable to clamp within the confines of said clamp an area of sheet material greatly in excess of the area of said mold cavity opening, said clamp defining a sheet forming cavity opposing said mold cavity, a gas supply means carried by said mold member for initially billowing clamp sheet material upwardly into said sheet forming cavity to enhance biaxial orientation of clamped sheet material, said mold having an annular ledge surrounding said opening and within that portion of said mold opposed in clamping relation by said clamp, and said gas supply means being solely in said ledge closely adjacent said mold portion opposing said clamp for directly impinging gas on a clamped heated plastic sheet to effect stretching of such sheet and billowing thereof into said sheet forming cavity starting at the periphery of that portion of clamped sheet material within said clamp.

2. An improvement according to claim 1 wherein said gas supply means includes an annular groove in said mold ledge adjacent that portion of said mold opposed in clamping relation by said clamp, and means for introducing a gas under pressure into said annular groove.

3. An improvement according to claim 1 wherein said sheet forming cavity is of a generally hemispherical configuration.

4. An improvement according to claim 1 wherein said sheet forming plunger projects into said sheet forming cavity to cooperate with said gas supply means and said sheet forming cavity to stretch and orient sheet material prior to entry of such sheet material into said mold cavity.

5. In an apparatus for the thermoforming of containers, said apparatus comprising a female mold member defining a mold cavity having an opening defined by a surrounding clamp surface, a clamp overlying said mold member to retain a sheet between said clamp and said mold member, means mounting said mold member and said clamp for relative movement axially of said mold cavity between a sheet clamping position and a molded article releasing position, and a sheet forming plunger carried by said clamp and movable relative to said clamp into said mold cavity for at least effecting an initial forming of a sheet within said mold cavity, the improvement comprising said clamp having a clamping surface surrounding said mold cavity opening and being radially outwardly spaced from said mold cavity opening wherein said clamp is operable to clamp within the confines of said clamp an area of sheet material greatly in excess of the area of said mold cavity opening, said clamp defining a sheet forming cavity opposing said mold cavity, a gas supply means carried by said mold member for initially billowing clamped sheet material upwardly into said sheet forming cavity to enhance biaxial orientation of clamped sheet material, said mold having an annular ledge surrounding said opening and within that portion of said mold opposed in clamping relation by said clamp, and said gas supply means being in said ledge closely adjacent said mold portion opposing said clamp for directly impinging gas on a clamped heated plastic sheet to effect stretching of such sheet and billowing thereof into said sheet forming cavity starting at the periphery of that portion of clamped sheet material within said clamp, said sheet forming plunger having expansion means for effecting radial expansion of said plunger after said plunger has advanced into said mold cavity, said expansion means including said plunger being formed in circumferential segments, and there are means for urging said segments apart in radial directions only.

6. In an apparatus for the thermoforming of containers, said apparatus comprising a female mold member defining a mold cavity having an opening defined by a surrounding clamp surface, a clamp overlying said mold member to retain a sheet between said clamp and said mold member, means mounting said mold member and said clamp for relative movement axially of said mold cavity between a sheet clamping position and a molded article releasing position, and a sheet forming plunger carried by said clamp and movable relative to said clamp into said mold cavity for at least effecting an initial forming of a sheet within said mold cavity, the improvement comprising said clamp having a clamping surface surrounding said mold cavity opening and being radially outwardly spaced from said mold cavity opening wherein said clamp is operable to clamp within the confines of said clamp an area of sheet material greatly in excess of the area of said mold cavity opening, said clamp defining a sheet forming cavity opposing said mold cavity, a gas supply means carried by said mold member for initially billowing clamped sheet material upwardly into said sheet forming cavity to enhance biaxial orientation of clamped sheet material, said mold having an annular ledge surrounding said opening and within that portion of said mold opposed in clamping relation by said clamp, and said gas supply means being in said ledge closely adjacent said mold portion opposing said clamp for directly impinging gas on a clamped heated plastic sheet to effect stretching of such sheet and billowing thereof into said sheet forming cavity starting at the periphery of that portion of clamped sheet material within said clamp, said gas supply means including an annular groove in said mold ledge adjacent that portion of said mold opposed in clamping relation by said clamp, and means for introducing a gas under pressure into said annular groove, said groove being provided with a porous gas passing member for diffusing gas passing out from said groove.

7. A method of thermoforming comprising the steps of providing a mold of the type including a mold cavity surrounded by an annular ledge, positioning a sheet of biaxially orientable plastic heated to a selected temperature in overlying relation to the mold, clamping the sheet against the mold ledge remote from the mold cavity, applying a sheet forming gas under pressure to the sheet from the mold ledge adjacent the clamped portion of the sheet to upwardly billow the sheet beginning generally at the periphery to effect biaxial orientation in said sheet including in a peripheral part of said sheet, engaging the billowed portion of the sheet with a plunger and forcing the sheet axially into the mold cavity, and then expanding the sheet to conform to the configuration of the mold cavity.

8. A method according to claim 7 wherein the billowing of the sheet is controlled by providing a sheet forming cavity in opposed overlying relation to the mold cavity and deforming the sheet within said sheet forming cavity.

9. A method according to claim 7 wherein the expanding of the sheet within the mold is effected by expanding the plunger.

10. A method according to claim 7 wherein the sheet forming gas is diffused prior to engaging the sheet.

11. A method according to claim 7 wherein the sheet forming gas is applied solely from the mold ledge.

* * * * *